US007693735B2

(12) United States Patent
Carmi et al.

(10) Patent No.: US 7,693,735 B2
(45) Date of Patent: Apr. 6, 2010

(54) DYNAMIC SCHEDULE MEDIATION

(75) Inventors: Irad Carmi, Beachwood, OH (US); Yuval Brisker, Beachwood, OH (US)

(73) Assignee: Etadirect Holdings, Inc., Beachwood, OH (US)

( * ) Notice: Subject to any disclaimer, the term of this patent is extended or adjusted under 35 U.S.C. 154(b) by 20 days.

(21) Appl. No.: 10/994,313

(22) Filed: Nov. 23, 2004

(65) Prior Publication Data

US 2006/0111957 A1    May 25, 2006

(51) Int. Cl.
*G06F 9/46* (2006.01)
(52) U.S. Cl. ......................................................... 705/9
(58) Field of Classification Search ...................... 705/9
See application file for complete search history.

(56) References Cited

U.S. PATENT DOCUMENTS

| | | | | |
|---|---|---|---|---|
| 4,937,743 | A * | 6/1990 | Rassman et al. ................ | 705/8 |
| 5,623,404 | A * | 4/1997 | Collins et al. .................... | 705/9 |
| 5,983,198 | A * | 11/1999 | Mowery et al. ................ | 705/22 |
| 5,987,377 | A * | 11/1999 | Westerlage et al. .......... | 701/213 |
| 6,006,159 | A * | 12/1999 | Schmier et al. ............. | 701/200 |
| 6,144,942 | A * | 11/2000 | Ruckdashel ..................... | 705/9 |
| 6,163,607 | A * | 12/2000 | Bogart et al. .......... | 379/266.01 |
| 6,282,486 | B1 * | 8/2001 | Bates et al. .................. | 701/117 |
| 6,370,231 | B1 * | 4/2002 | Hice ......................... | 379/32.01 |
| 6,459,787 | B2 * | 10/2002 | McIllwaine et al. .... | 379/265.06 |
| 6,496,568 | B1 * | 12/2002 | Nelson ...................... | 379/88.12 |
| 6,609,100 | B2 * | 8/2003 | Smith et al. ...................... | 705/8 |
| 6,678,613 | B2 * | 1/2004 | Andrews et al. ............. | 701/213 |
| 6,823,357 | B1 * | 11/2004 | Du et al. ....................... | 709/203 |
| 6,829,583 | B1 * | 12/2004 | Knapp et al. .................... | 705/5 |
| 6,859,722 | B2 * | 2/2005 | Jones .......................... | 701/200 |
| 6,879,836 | B2 * | 4/2005 | Nakamoto et al. ........ | 455/456.2 |
| 6,898,569 | B1 * | 5/2005 | Bansal et al. ................... | 705/9 |
| 6,952,645 | B1 * | 10/2005 | Jones .......................... | 701/201 |
| 6,985,872 | B2 * | 1/2006 | Benbassat et al. .............. | 705/8 |
| 7,139,722 | B2 * | 11/2006 | Perrella et al. ................. | 705/9 |
| 7,206,837 | B2 * | 4/2007 | Seligmann ................... | 709/224 |
| 7,359,864 | B2 * | 4/2008 | Carlson et al. ................. | 705/9 |
| 7,464,046 | B2 * | 12/2008 | Wilson et al. .................. | 705/9 |
| 2001/0047288 | A1 * | 11/2001 | Jacobs et al. ................... | 705/9 |
| 2002/0002548 | A1 * | 1/2002 | Roundtree ..................... | 707/1 |
| 2002/0016645 | A1 * | 2/2002 | Jacobs et al. ................ | 700/100 |

(Continued)

OTHER PUBLICATIONS

Griggs, Gregory W. "Behind the Wheel". Nov. 2, 2004. Los Angeles Times.*

*Primary Examiner*—Jonathan G. Sterrett
*Assistant Examiner*—Peter Choi
(74) *Attorney, Agent, or Firm*—McDermott Will & Emery LLP

(57) ABSTRACT

An apparatus and method provides dynamic schedule mediation by scheduling and monitoring appointments between a service provider and customers. The apparatus and method uses a statistical analysis to determine a best appointment time based on at least one of: historical performance patterns, the type of service requested during the appointment, geographic location of the customer or the service provider, time of day, time of year, weather, skills of the service provider, and automobile traffic conditions. The system and method continuously monitors changes to the appointment initiated by the customer or the service provider and notifies the other. The statistical information of a service provider may also be used to evaluate the rules of the service provider and to evaluate individual field service personnel of the service provider.

18 Claims, 6 Drawing Sheets

U.S. PATENT DOCUMENTS

| | | | |
|---|---|---|---|
| 2002/0016729 A1* | 2/2002 | Breitenbach et al. | 705/9 |
| 2002/0019755 A1* | 2/2002 | Kagami | 705/5 |
| 2002/0035493 A1* | 3/2002 | Mozayeny et al. | 705/5 |
| 2002/0065702 A1* | 5/2002 | Caulfield | 705/9 |
| 2002/0069017 A1* | 6/2002 | Schmier et al. | 701/213 |
| 2002/0099500 A1* | 7/2002 | Schmier et al. | 701/200 |
| 2003/0014301 A1* | 1/2003 | Yaffe et al. | 705/11 |
| 2003/0060979 A1* | 3/2003 | Andrews et al. | 701/213 |
| 2004/0085909 A1* | 5/2004 | Soliman | 370/252 |
| 2005/0043986 A1* | 2/2005 | McConnell et al. | 705/11 |
| 2005/0171856 A1* | 8/2005 | Takahashi et al. | 705/26 |

\* cited by examiner

DYNAMIC SCHEDULE MEDIATION

FIELD OF THE INVENTION

The present invention relates to a system and method of managing appointments between service providers and customers. More particularly, the present invention relates to a system and method for dynamically managing, scheduling and monitoring appointments between service providers and customers.

BACKGROUND OF THE INVENTION

Currently, customers of a broad spectrum of service providers must spend a significant portion of their productive day, skipping hours of work, waiting for scheduled appointments. Customers are often required to take off a full day's work in order to be at home for a 30-minute telephone or cable technician visit. Appointments of this type are often scheduled within a 4-8 hour window, during which the customer has no way of knowing when exactly the service provider's personnel will arrive. This is a source of serious customer aggravation and damage to customer relations.

Service provider personnel, on the other hand (whether delivery personnel, technicians or doctors), waste productive time on inefficient scheduling, missed appointments or late customers. For example, cable technicians often arrive at the customer's door to respond to a problem reported by the customer only to learn that the visit is no longer needed, because the problem "fixed itself." Also, when a customer misses an appointment, such as doctor's appointment, i.e. a "no-show" customer, the service provider looses revenue from the no-show customer, and also has inconvenienced other customers that may have desired to utilize the services during the time of the missed appointment. Likewise, when a customer is late for an appointment, the service provider is often required to shuffle their appointment calendar to accommodate the late customer by rescheduling other customers to accommodate the late customer.

Accordingly, a system and method for dynamically managing, monitoring and scheduling customer appointments is needed.

SUMMARY OF THE INVENTION

The present invention addresses the problems of the prior art and provides a solution thereto.

In the present invention, an apparatus for managing appointments between a customer and a service provider may comprise: a communication gateway which receives and delivers communications; a microprocessor that schedules appointments of a customer with a service provider based on a communication from a customer, business rules of a service provider and a statistical determination of performance of the service provider.

The apparatus may further comprise a statistics engine, and wherein the statistical determination of performance of the service provider is based on at least one of: historical performance patterns, the type of service requested during the appointment, geographic location of the customer or the service provider, time of day, time of year, weather, skills of the service provider, or automobile traffic conditions.

The apparatus may further comprise a notification engine which provides a predetermined notification to the customer related to an appointment. The predetermined notification may include a reminder to the customer of an appointment, and may include a notification of a change in an appointment schedule.

In the apparatus, the microprocessor may select a service provider from a plurality of service providers for an appointment based on the historical performance patterns of the plurality of service providers.

In the apparatus, the microprocessor may determine if a delay occurs in a schedule of appointments and if the delay will propagate to affect other appointments. The determination of a delay will propagate may be based on a type of appointment of the requested appointment, a type of delay of the delay, or a statistical determination of delay propagation based on historical information related to the requested appointment. The statistical determination may be based on at least one of duration of appointment, start of appointment, or end of appointment.

In accordance with the present invention, a method of dynamically scheduling appointments between a customer and a service provider using a computer may comprise the steps of: receiving requests for appointments from a customer; determining an appointment schedule using a microprocessor based on the request for an appointment from the customer, business rules of a service provider, and a statistical determination of performance of the service provider; monitoring communications from the customer and the service provider which alter the appointment schedule; and notifying the customer and service provider of alteration of the appointment schedule.

In the method of the present invention, the statistical determination of performance of the service provider may be based on at least one of: historical performance patterns, the type of service requested during the appointment, geographic location of the customer or the service provider, time of day, time of year, weather, skills of the service provider, and automobile traffic conditions.

In the method, the step of notifying the customer may provide a predetermined notification to the customer related to an appointment, a reminder to the customer of an appointment, and/or a notification of a change in an appointment schedule.

The method may further comprise the steps of determining if a performed appointment was delayed, and determining if the delay will propagate to other appointments to be performed. The method may further comprise the step of modifying the appointment schedule if the delay is determined to propagate, and notifying customers of a change in appointment schedule. The step of determining if the delay will propagate may include determining one of: whether the service is repetitive, whether the delay was caused by a global problem, or whether the delay is likely to propagate based on historical information indicative of characteristics of the appointment.

The method may further comprise selecting a service provider from a plurality of service providers for an appointment based on the historical performance patterns of the plurality of service providers.

The method may further comprise the steps of prompting customers to respond to automated messages confirming an appointment and applying a response of the customer to an existing appointment schedule.

The method may further comprise the steps of periodically scanning system logs collect statistical data indicative of the statistical determination of performance of the service provider, evaluating business rules of the service provider using the statistical data, and providing optimization recommendations.

The method may, further comprise the steps of monitoring a plurality of field service personnel associated with the service provider in providing a requested service, providing continuously updated statistical evaluation of field services personnel activities, and indicating performance of a service of each field service personnel.

In the present invention, a computer readable medium may carry instructions for a computer to perform a method of dynamically scheduling appointments between a customer and a service provider comprising the steps of: receiving requests for appointments from a customer; determining an appointment schedule using a microprocessor based on the request for an appointment from the customer, business rules of a service provider and a statistical determination of performance of the service provider; monitoring communications from the customer and the service provider which alter the appointment schedule; and notifying the customer and service provider of alteration of the appointment schedule.

In the computer readable medium, the statistical determination of performance of the service provider may be based on at least one of: historical performance patterns, the type of service requested during the appointment, geographic location of the customer or the service provider, time of day, time of year, weather, skills of the service provider, and automobile traffic conditions.

In the computer readable medium, the step of notifying the customer may provide a predetermined notification to the customer related to an appointment, a reminder to the customer of an appointment, and/or a notification of a change in an appointment schedule.

The computer readable medium may further comprise selecting a service provider from a plurality of service providers for an appointment based on the historical performance patterns of the plurality of service providers.

The computer readable medium may further comprise instructions to instruct a computer to perform the steps of prompting customers to respond to automated messages confirming an appointment and applying a response of the customer to an existing appointment schedule.

The computer readable medium may further comprise instructions to instruct a computer to perform the steps of periodically scanning system logs collect statistical data indicative of the statistical determination of performance of the service provider, evaluating business rules of the service provider using the statistical data, and providing optimization recommendations.

The computer readable medium may further comprise instructions to instruct a computer to perform the steps of monitoring a plurality of field service personnel associated with the service provider in providing a requested service, providing continuously updated statistical evaluation of field services personnel activities, and indicating performance of a service of each field service personnel. The computer readable medium may further comprises instructions to perform the steps of determining if a performed appointment was delayed, and determining if the delay will propagate to other appointments to be performed. The computer readable medium may further comprising instructions to perform the steps of modifying the appointment schedule if the delay is determined to propagate, and notifying customers of a change in appointment schedule. In the computer readable medium the instructions to perform the step of determining if the delay will propagate includes determining one of: whether the service is repetitive, whether the delay was caused by a global problem, or whether the delay is likely to propagate based on historical information indicative of characteristics of the appointment.

Dynamic schedule mediation addresses the deficiencies described in the background of the invention by maintaining a self-calibrating repository of personal performance patterns for each service provider, tracking the effect of parameters such as the service provider's skills, the task type, the location, the time of day, the time of year, the weather conditions, the traffic conditions, and the service provider's performance. The repository data is adjusted on an ongoing basis to always reflect the most up to date information about each service provider. The invention preferably notifies service recipients of upcoming service appointments, using information describing the performance pattern of the service provider and the actual time of service delivery of one service recipient to determine probable changes to expected time of service delivery of other service recipients and preferably notifies future customers of the change.

BRIEF DESCRIPTION OF THE DRAWINGS

The accompanying drawings, which are incorporated in and form a part of the specification, together with the description serve to explain the principles of the invention. In the drawings.

DETAILED DESCRIPTION OF THE INVENTION

Dynamic Schedule Mediation provides a self-learning system and method that significantly improves time management and efficiency for service providers and service recipients ("customers") by analyzing real time service delivery data and a service provider's learned historical performance patterns, and automatically notifying customers of the status and expected time of their scheduled appointments through personalized alerts and reminders to any communications device.

Figure 1:
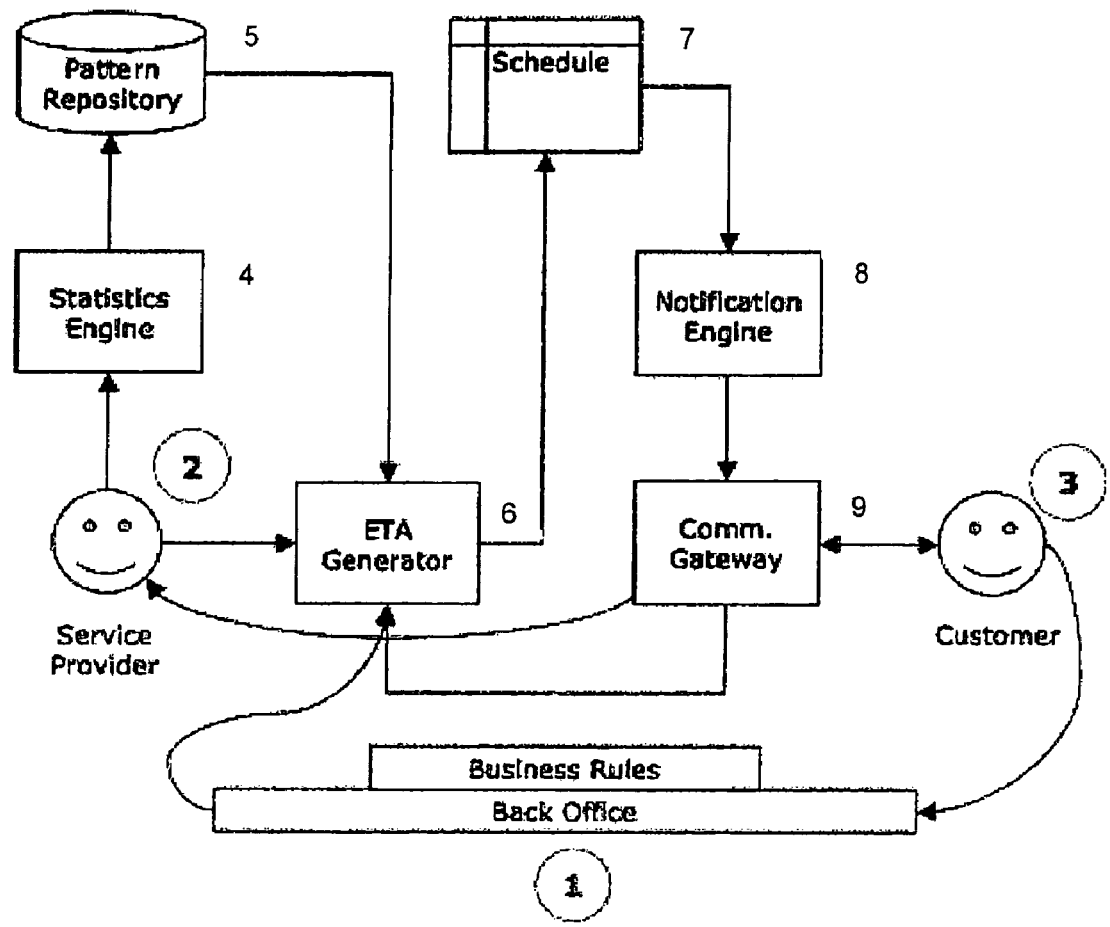
FIG. 1 illustrates a logical flow of interaction between the dynamic scheduler of the invention, customers and service providers.

FIG. 1 illustrates an exemplary system for implementing the principles of the present invention. For convenience of explaining the principles of the invention, FIG. 1 illustrates three principle entities being involved, a back office 1 which manages the operations of a company using the invention, a service provider 2 which delivers the service to the customer on behalf of the company, and a customer 3 which receives the service from the service provider. Dynamic scheduler 10 preferably communicates with each of the back office 1, service provider 2 and customer 3 to schedule the services requested using a communication gateway 9. Although three entities are discussed for convenience of understanding the principles of the invention, those of skill in the art will appreciate that a single party, business or person may represent two of the entities, such as the service provider being combined with the back office. Also, those of skill in the art will appreciate that numerous entities may be involved, including several back ends working with a single service provider and/or customer, several service providers working with the same back end and/or customer, and several customers working with a single service provider and/or a single back end.

The customer preferably communicates with the dynamic scheduler 10, back office 1 and/or the service provider 2 to schedule a desired service. The requested appointment may be provided to the dynamic scheduling system 10 through communication gateway 9. Dynamic scheduler system 10 utilizes statistical performance information from the rules of the service providers and to determine the expected time of appointment (ETA).

The service provider 2 preferably reports the start and end time of each transaction. Each report is processed by a statistics engine 4, which preferably calculates a performance profile, including the effect of the transaction type, geographic location, service provider skills, time of day, time of year, weather, traffic patterns, and the performance profile of a service provider. Statistics engine 4 may be used by the service providers 2 as a workflow analysis tool, which monitors and analyzes performance in meeting appointment times to help improve scheduling efficiency. The performance of each person (e.g. delivery person) providing a requested service also may be determined to allow a service provider to determine inefficiencies in providing services. Statistics engine 4 preferably receives real time data updates from each service provider through communication gateway 9, which may include a web browser interface, a mobile communication device, or a Web Services API connection to a legacy scheduling system (e.g. a legacy scheduling system), regarding the planned delivery of service.

The statistics engine 4 preferably applies statistical algorithms to real time data updates received from the service providers, and preferably provides the calculated performance profile to a pattern repository 5. By applying statistical algorithms to service provider data updates from the field, data is preferably created that describes the performance of the service providers according to different parameters such as location, time of day, type of task, skill set, weather, or traffic conditions. This is an ongoing process, constantly optimizing the pattern data. The pattern repository is preferably a RAM device but may be any form of computer readable storage medium. The longer period of time the pattern repository is used for a service provider 2, generally the more accurate it is.

Statistics engine 4 may continuously provide an updated statistical summary of field service personnel activities in a web browser interface, providing drill down capability to view the continuously updated progress of each service personnel in a web browser interface.

The back office 1 provides rules associated with the service provider to dynamic scheduler 10. The service providers business rules may be particular to each service provider and allow the service provider to define parameters that instruct the dynamic scheduler system when to send a reminder or when to inform the customer of a scheduling change.

The performance profile from the pattern repository 5 and the rules from the back office are provided to an ETA generator 6. The ETA generator 6 preferably applies the company's business rules and the performance profile of the service provider and their personnel, stored in pattern repository 5, as well as real time input from the service provider to create an estimated time of arrival or performance for the transaction. The ETA generator 6 also preferably uses the performance profile and the rules to dynamically calculate the effect of the reported start and end times on the scheduled ETA as the time for the scheduled appointment becomes closer. The ETA generator preferably analyzes the incoming data from the service provider and the customer, juxtaposing with planned delivery of service schedule and using the results of the analysis to make changes to the rest of the schedule. For example, the ETA generator 6, preferably may receive update information that an earlier appointment of a prior customer was delayed, and will determine if the ETA of a later customer's appointment has changed.

The ETA is provided to scheduler 7 where the service provider schedules the service or delivery, and may determine a delivery route to make the delivery. Scheduler 7 preferably contains and maintains a database with the service provider's schedule, which has been uploaded from the service provider through communication gateway 7. The schedule is provided to a customer by a notification engine 8. The notification engine 8 preferably actively and automatically reminds customers about their upcoming appointments at preset, customer-defined time intervals or the service providers defined intervals. Notification engine 8 may also deliver up to the minute information regarding changes to the customer's scheduled appointment to both the customer 3 and the service provider 2. If necessary, according to company's business rules, the notification engine 8 will inform the customer of any change to the ETA.

The customer is prompted to respond to messages generated by the notification engine 8 and delivered through the communications gateway 9. If the response by the customer affects the schedule, the change in the schedule is communicated to the ETA generator and may preferably be communicated to a mobile employee of a service provider. Dynamic scheduler 10 may preferably store a one or more notification message templates of a service provider, both text and voice, in multiple languages, in a database, which may be utilized by the notification engine 8 to alert a customer of an up coming appointment or a change in the ETA. Dynamic scheduler 10 may also preferably store one or more notification message templates according to preferences of a customer in database, such as preferred contact phone numbers or email addresses, both text and voice, in multiple languages, in a database, which may be utilized by the notification engine 8 to alert a customer of an up coming appointment or a change in the ETA.

Communication gateway 9 may include a web browser interface of a computer, a mobile communication device such as a cell phone or PDA device or the like, or a Web Services API connection to a legacy scheduling system, regarding the planned delivery of service, or may simply utilize a conventional telephone and telephone network. Communication gateway 9 preferably provides a two-way, communication channel with customers, using multiple technologies, such as, but not limited to, voice messaging, voice recognition, electronic mail, pagers, cellular phones, SMS messages, PC's web browsers and portable internet enabled devices. Communication gateway 9 also preferably provides a real time, two-way, communication channel with service providers using multiple technologies, such as, but not limited to, IVR, cellular phones (WAP/J2ME), SMS messages, PC's web browsers and portable internet enabled devices, and by collecting information from service providers' existing scheduling system (such as CRM and ERP scheduling systems) using Web Services or other integration technologies. The customer may access a website maintained by the backend 1 to schedule the appointment. The requested transaction can be a service appointment or merchandise delivery.

Figure 2:
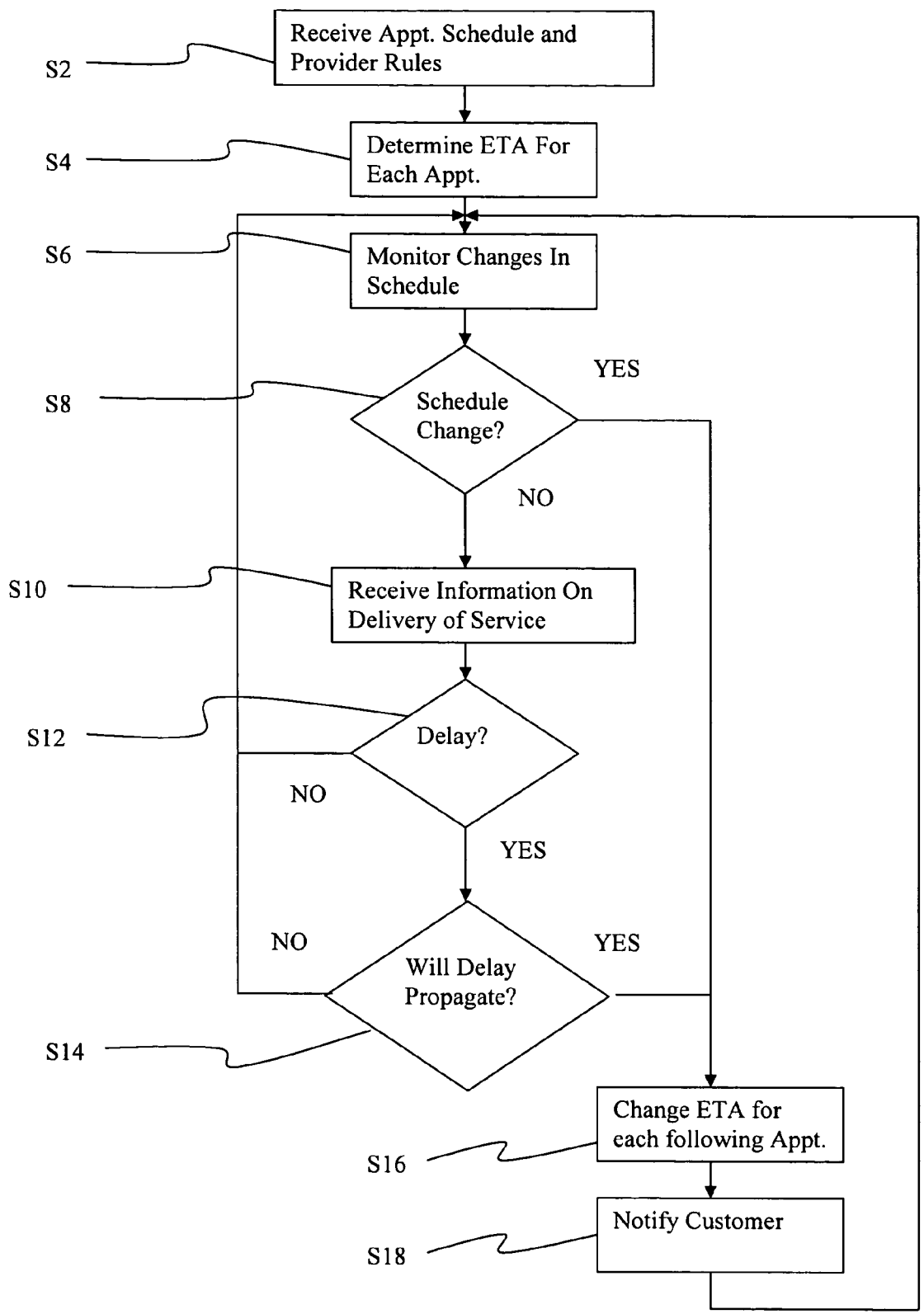
FIG. 2 illustrates an exemplary flow diagram of the processes performed by the present invention.
Figure 3:
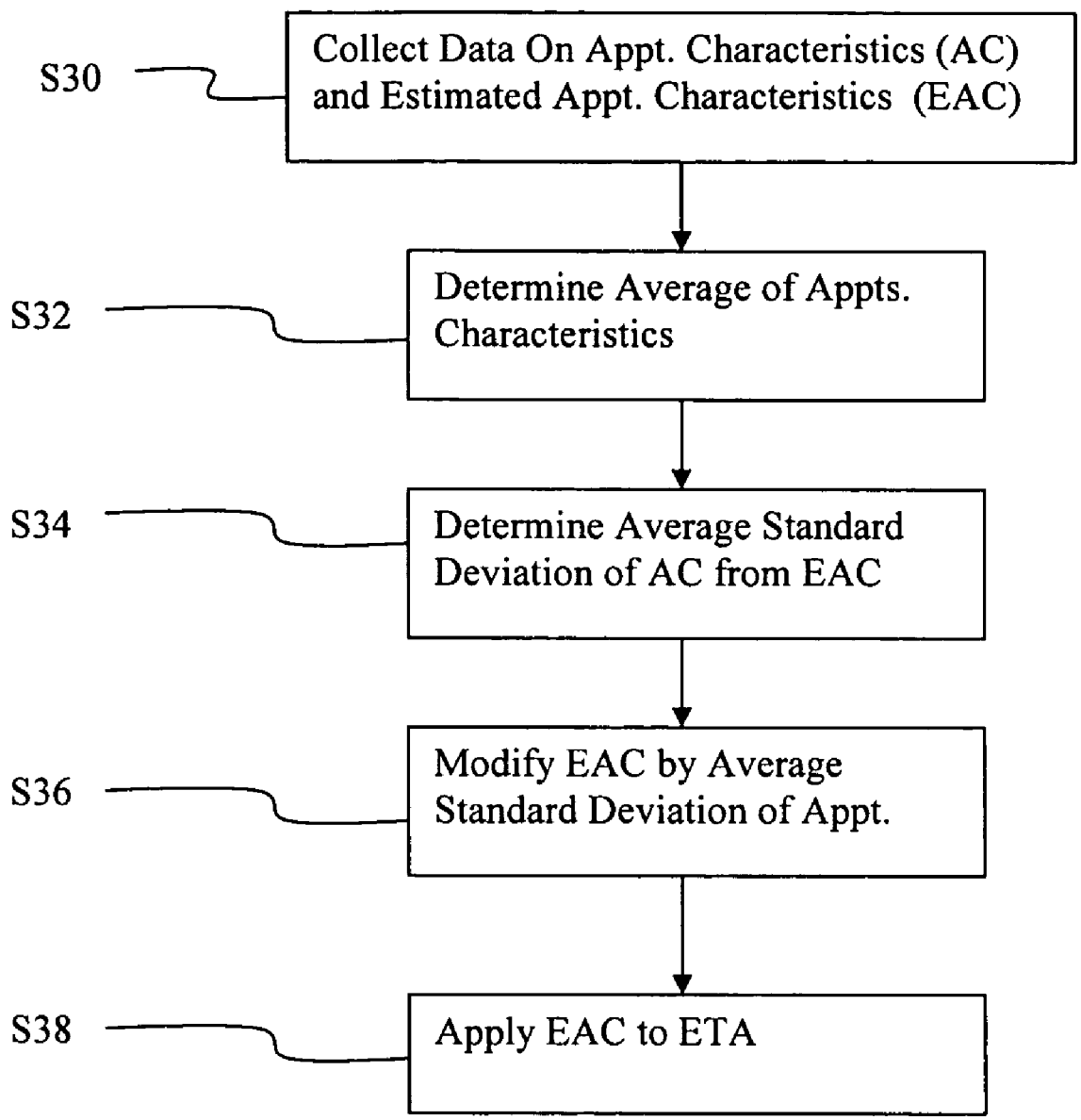
FIG. 3 illustrates an exemplary process for determining the ETA of a scheduled appointment.

FIG. 2 illustrates an exemplary flow of the operation of the system of FIG. 1. As illustrated in FIG. 2, a request for a service appointment is received by the dynamic scheduler 10, step S2. This request may be made directly to a service provider who will perform the service or to the back office. The back office provides the rules of the service provider to the dynamic scheduler 10 (step S2) and the dynamic scheduler 10 accesses the pattern repository 5 for the service provider. The dynamic scheduler 10 generates the ETA with ETA generator 6 (step S4) using the service provider rules, the request for an appointment, and the statistical variables from the pattern repository. An exemplary process for generating an ETA is illustrated in FIG. 3. Dynamic scheduler 10 monitors for changes in the schedule, such as a customer canceling an appointment or a technician being unable to provide the service, step S6. If the schedule is changed, step S8, a new ETA is generated, step S16, and the customer is notified of the change, step S18. The notification may be automatically performed by any communication technique such as: voice telephony, wireless telephony, wireless handheld device, SMS messages, pager, email, posting of information on an internet website, and/or facsimile.

Customers are preferably prompted to respond to automatic messages sent by the dynamic scheduler system 10. Preferably communication gateway 9 is capable of receiving and processing touch tone telephony input, natural voice recognition, browser based applications, and/or a variety message templates. Accordingly, the customer's feedback may be received and applied to the existing schedule, according to the service provider's business rules. In this manner, dynamic scheduler 10 continuously scans the database for upcoming appointments, and for messages generated by the processing of changes to existing appointments.

If the appointment has not been changed, NO in step S8, the service is preferably performed at the scheduled appointment time. Preferably, the person providing the service provides information on the characteristics of the performance of the service, step S10, such as actual start time of the appointment, and end time of the appointment, and actual duration of the appointment may be determined. The information of the characteristics of the service may be transmitted through any communication mechanism.

Figure 4:
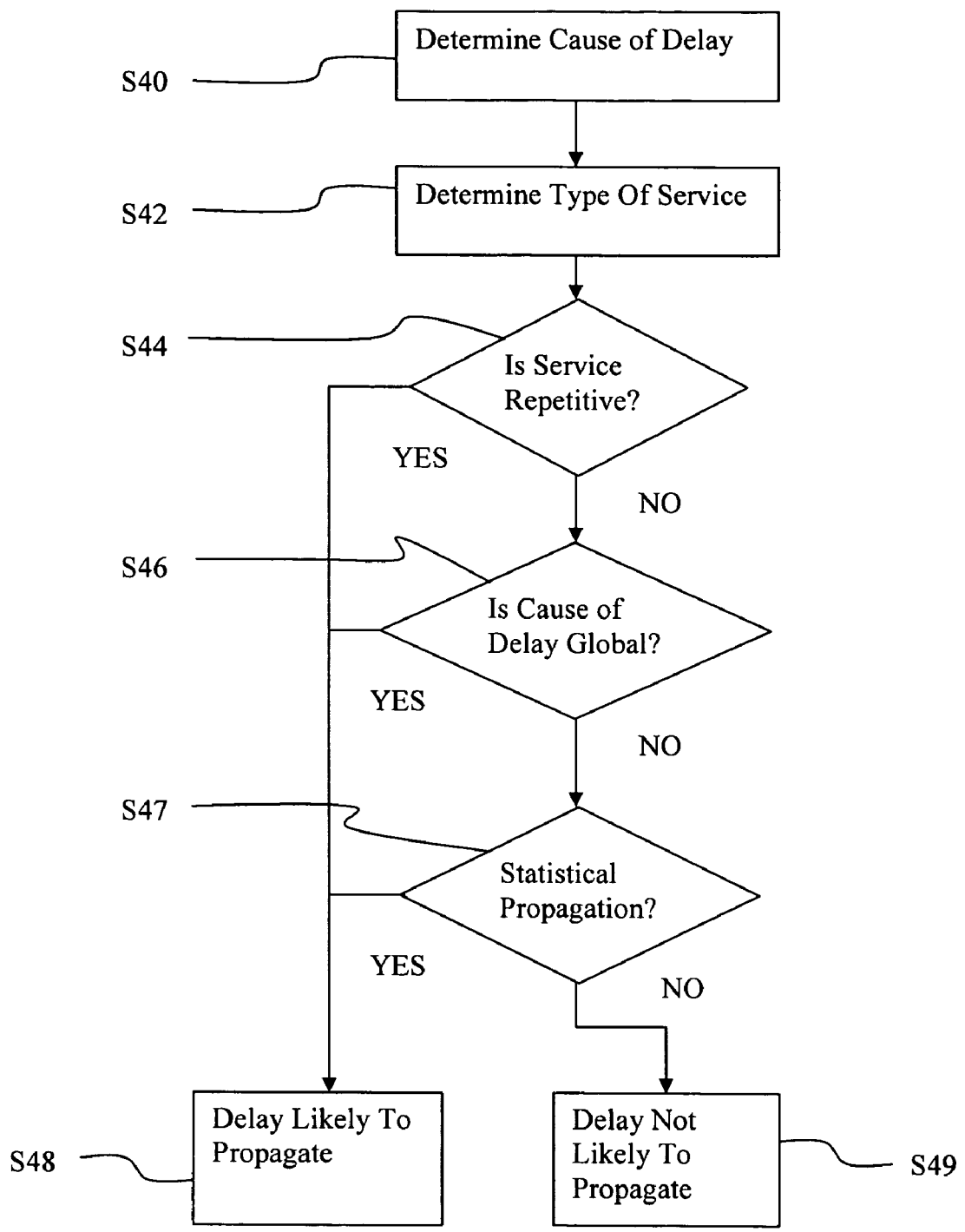
FIG. 4 illustrates an exemplary process for determining if a delay will propagate to affect other appointments.

Using the information of the characteristics of the appointment, the presence of a delay in the appointment schedule may be determined, step S12. If there is no delay, NO in step S12, the appointment schedule remains unchanged and the process continues to monitor the appointment schedule. If there is a delay in the appointment schedule, YES in step S12, then a determination is made as to whether the delay will propagate to cause delays in later scheduled appointments, step S14. An exemplary process for determining if a delay will propagate is illustrated in FIG. 4, which is discussed later. If the delay is not likely to propagate, NO in step S14, then the appointment schedule remains unchanged and the process continues to monitor the appointment schedule. If the delay is likely to propagate, YES in step S14, a new ETA is generated for each following appointment that may be affected, e.g. the appointments later in the same day, step S16. The customer is preferably notified of the delay and the new appointment schedule, step S18.

Where a plurality of service providers are associated with dynamic scheduling system 10, a hierarchy of service providers may be created and stored in a database. The hierarchy may be based on service performance, such as proximity to the desired service, the earliest available time for a service provider to provide the service, the statistical performance of a service provider in meeting their service times, and/or customer satisfaction or complaints regarding a service provider's performance. The hierarchy may be used to select a particular service provider from among the plurality of service providers to perform the service.

FIG. 3 illustrates an exemplary process for determining the ETA of a scheduled appointment, which may be used in step S4 of FIG. 2. The ETA generated in FIG. 3 preferably provides an ETA of each of the appointments on the schedule prior to performance of the appointments on the schedule. For example, the process in FIG. 3 may be performed at the end of a business day to determine the ETA of each scheduled appointment for the following business day or for scheduled appointments for the following week. As illustrated in FIG. 3, data is collected on characteristics of appointments which were performed and data is collected on indicating the corresponding estimated characteristics of the appointments, step S30. The appointment characteristics may include the duration of the appointment, the start time of the appointments, and may be determined for each service person performing the appointment, the calendar date of the appointment, the type of appointment, the weather conditions and the like. The average actual characteristics (e.g. duration) of the performed appointments is preferably determined in step S32. Then average standard deviation of the actual characteristics of the appointments from the estimated characteristics EACs are determined in step S34. The estimated appointment characteristics are preferably modified to reduce the average standard deviations between the EACs and the actual appointment characteristics in step S36. The modification in step S36 may be performed by simply adding or subtracting the average standard deviations from the EACs to produce new EACs. The new EACs may then be applied to ETA generator in step S4. Those of skill in the art will appreciate that the process in FIG. 3 is a "self learning" process which adjusts the ETAs by using statistical historical data to adjusting the EACs of the appointments.

FIG. 4 illustrates an exemplary process for determining if a delay will propagate to affect other appointments in accordance with step S14 of FIG. 2. The process illustrated in FIG. 4 is preferably performed on a real time basis during the performance of appointments. As illustrated in step S40, once a delay has been reported (step S12 in FIG. 2), the cause of the delay is identified from information provided by the person providing the service. Any number of predetermined causes of delay may be provided, such as traffic delays, weather delays, prior appointment duration was longer than the estimated appointment duration, equipment failure, parts supply delay, customer failed to meet appointment time, and the like. The type of service is also determined, step S42, to determine if the service is repetitive such that a later appointment is expected to have the same characteristics (e.g. duration) as a prior appointment. For example, a technician installing television cable service to a new customer may likely perform the same type of work at each customer and hence, the service provided may be expected to have about the same duration for each customer.

As illustrated in step S44, if the service is repetitive, the process determines that the delay is likely to propagate, S48. Likewise, if the delay is a global delay, step S46, which will effect one or more appointments, e.g. inclement weather, equipment failure, parts supply interruption, then the process determines that the delay is likely to propagate, step S48. Also, if the particular type of delay, or a delay from the person providing the service, is statistically likely to propagate based on historical information collected of the characteristics of the appointments, then the process determines that the delay will propagate. For example, based on historical information, it may be determined that a delay caused by traffic at ten AM on Thursday causes a delay in an appointment scheduled for three PM Thursday 75% of the time. In another example, it may be determined, based on historical information, that delays in the service provided by a particular service technician on a Monday morning has a 90% likelihood of propagating to appointments scheduled on Monday afternoon.

Those of skill in the art will appreciate that a threshold percentage of historical delay propagation to determine a likelihood of a present delay being propagated may be set at any desired value, such as 90, 80, 75, 51, and even 40%, and may be based on the impact that a delay may have on the service requested. If the determination is NO in each of steps S44, S46 and S47, then the process determines that the delay is not likely to propagate, step S49.

Those of skill in the art will appreciate that steps S40 and S42 may occur in any order and may at the same time. Those of skill in the art will also appreciate that steps S44-S47 also may occur in any order or at the same time independently of each other.

Figure 5:
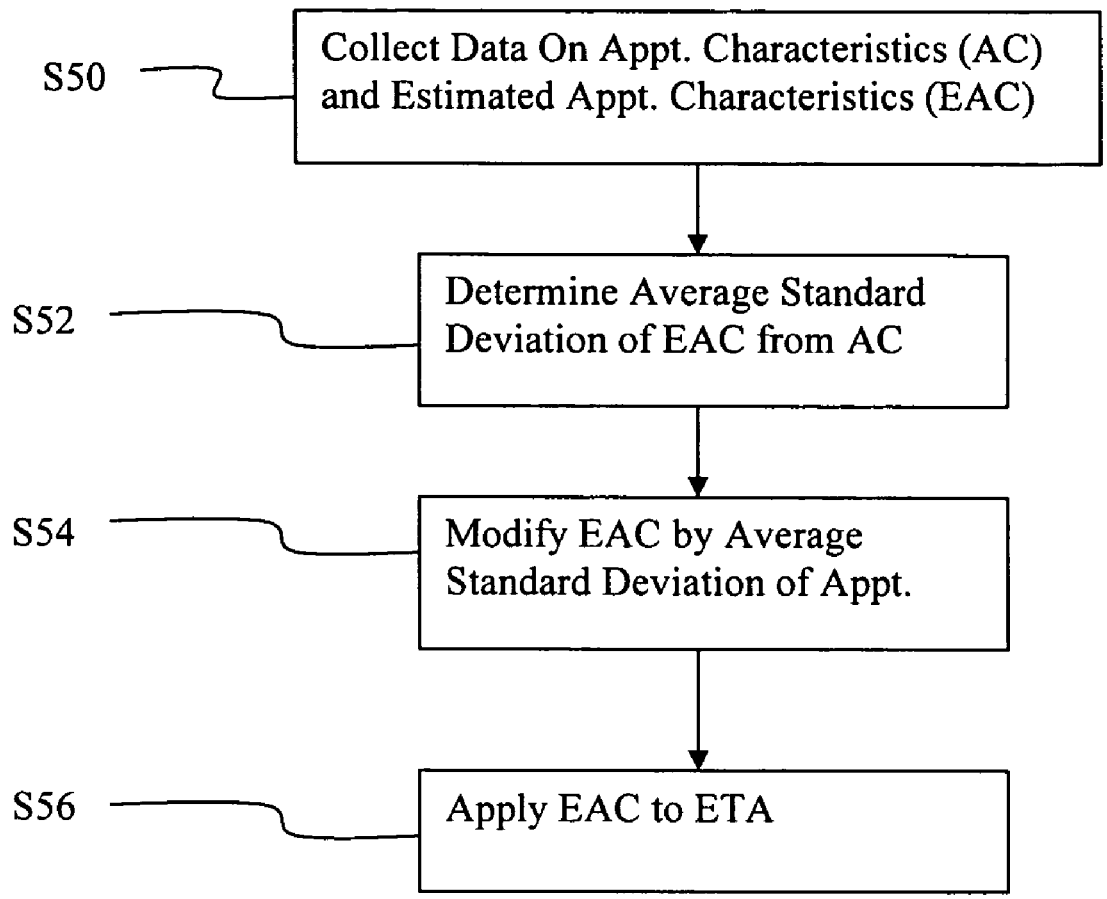
FIG. 5 illustrates an exemplary process for a real time recalculation of a scheduled ETA.

FIG. 5 illustrates an exemplary process for a real time recalculation of a scheduled ETA, which may be utilized in step S18 of FIG. 1. As illustrated in FIG. 5, data is collected on appointment characteristics for performed appointments (AC) and the corresponding estimated characteristics of pending appointments (EAC), step S50. The appointment characteristics may include the same characteristics used in the process illustrated in FIG. 3, including the duration of the appointments, the start or arrival time of the appointments, and may be determined for each service person performing the appointment, the calendar date of the appointment, the type of appointment, the weather conditions and the like. An average standard deviation between the characteristics of the performed appointments (AC) and the estimated characteristics of the pending appointments (EAC) may be determined, step S52. The estimated characteristics of the pending appointments (EAC), e.g., the start or arrival times, are modified to reduce or eliminate the average standard deviation by adding or subtracting the amount of the average standard deviation to the corresponding EAC, step S54. The modified EACs are applied to generate a new ETA for the appointment, step S56.

Figure 6:
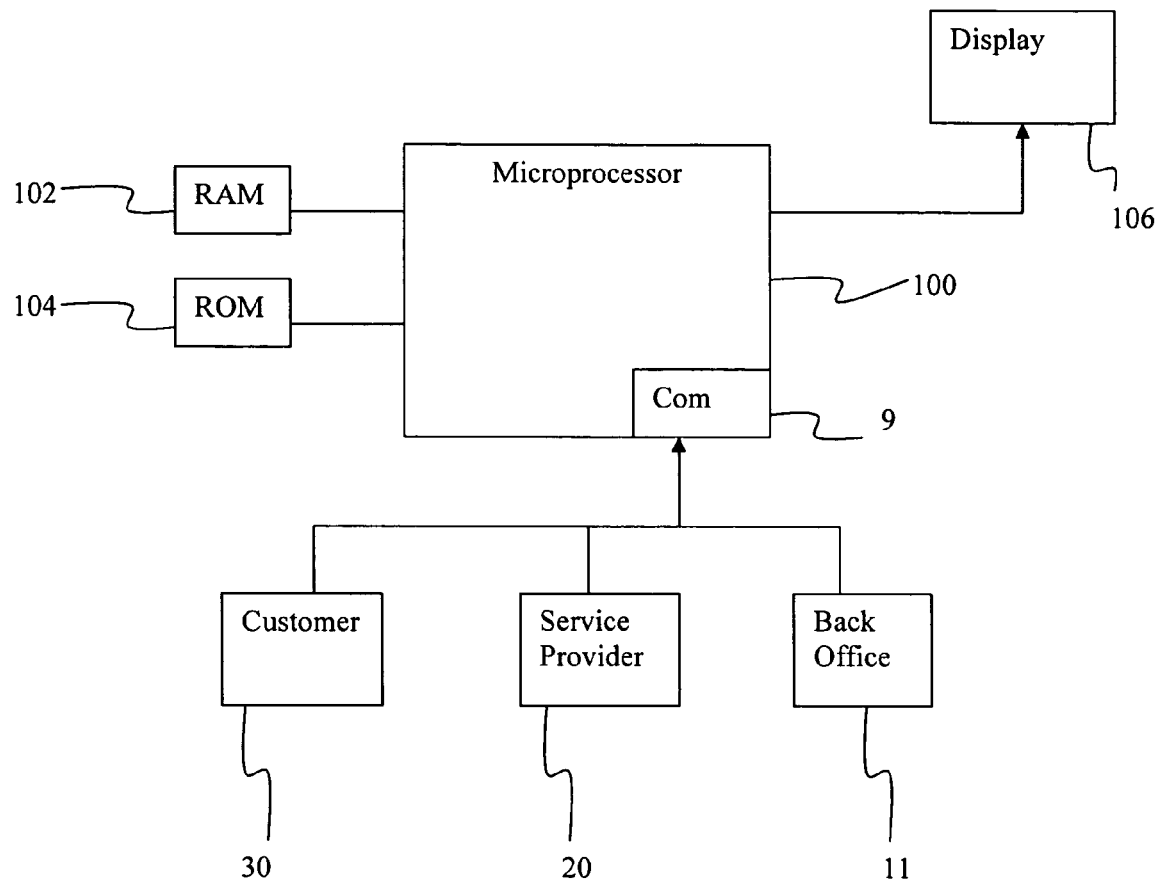
FIG. 6 illustrates an exemplary architecture of a dynamic scheduler of the present invention.

As illustrated in FIG. 6, the dynamic scheduler 10 is preferably implemented by one or more microprocessors 100. Preferably, ETA generator 6, statistics engine 4, scheduler 7, notification engine 8 are contained in a microprocessor as one or more software programs, respectively, and each may be contained on ROM 104 or RAM 102 to be accessed by microprocessor 100, or may be contained in microprocessor 100. Likewise, communication gateway 9 may also be contained in the same microprocessor or a different microprocessor and preferably operates as a software program. Pattern repository 5 is preferably a computer readable memory, such as RAM, but may be any suitable computer readable memory device, including a magnetic medium RAM device 102, which may be any suitable RAM device such as a hard disk drive, an optical disc drive or an integrated circuit based RAM device. Pattern repository preferably stores information collected as historical information indicative of the characteristics of performed appointments, which may be utilized to determine ETAs, as illustrated in the processes of FIG. 2-5. Although illustrated as external to microprocessor 100, RAM 102 and/or RAM 104 may also be integrally formed within microprocessor 100.

Microprocessor 100 preferably communicates with communications devices of the customers 30, service providers 20 and the back offices 11 through communication gateway 9, as described above. Microprocessor preferably provides information, such as a customer's ETA and a service provider's schedule to a display 106, where a system operator may view the information. The system operator may also make authorized changes to the information through a variety of inputs, such as a key board or mouse (not shown).

Alternatively, dynamic scheduler 10 may be a hard wired circuit, and/or may be a combination of hard wired circuits and digital circuitry, such as microprocessors.

Software functionalities of a computer system involve programming, including executable code, may be used to implement the above described techniques. The software code is executable by the general-purpose computer. In operation, the code and possibly the associated data records are stored within a general-purpose computer platform. At other times, however, the software may be stored at other locations and/or transported for loading into the appropriate general-purpose computer systems. Hence, the embodiments discussed above involve one or more software products in the form of one or more modules of code carried by at least one machine-readable medium. Execution of such code by a processor of the computer system enables the platform to implement the catalog and/or software downloading functions, in essentially the manner performed in the embodiments discussed and illustrated herein.

As used herein, terms such as computer or machine "readable medium" refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in any computer(s) operating as one of the server platform, discussed above. Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, less commonly used media such as punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Dynamic schedule mediation addresses the deficiencies described in the background of the invention by maintaining a self-calibrating repository of personal performance patterns for each service provider, tracking the effect of parameters such as service provider's skills, task type, location, time of day, time of year, weather conditions, and traffic conditions, on the service provider's performance. The repository data is adjusted on an ongoing basis to always reflect the most up to date information about each service provider. The invention preferably notifies service recipients of upcoming service appointments, using information describing the performance pattern of the service provider and the actual time of service delivery of one service recipient to determine probable changes to expected time of service delivery of other service recipients and preferably notifies future recipients of the change.

A variety of businesses will benefit from the techniques of the present invention, including delivery services, telephone and cable operators, medical care givers and variety of other appointment-based service providers.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for managing appointments between a customer and a service provider comprising a plurality of individuals, said apparatus comprising:
   a communication gateway configured to receive and deliver communications;
   a microprocessor configured to determine the estimated time of arrival or performance of a service appointment; and
   a statistics engine, wherein a statistical determination of a performance of the service provider is based on at least one of: historical performance patterns, a type of service requested during a requested appointment, geographic location of the customer or the service provider, time of day, time of year, weather, skills of at least one individual of the service provider, or automobile traffic conditions,
   wherein the microprocessor is configured to determine if a delay occurs in a schedule of appointments and determines if the delay will propagate to affect other appointments,
   wherein the determination if a delay will propagate is based on at least one of a type of appointment of the requested appointment, a type of delay of the delay, and a statistical determination of delay propagation based on historical information related to the requested appointment,
   wherein said microprocessor is configured to monitor performance of each of said plurality of individuals so as to provide a continuously updated statistical evaluation for each of said plurality of individuals,
   wherein the microprocessor is configured to maintain a self-calibrating repository of personal performance patterns for each individual based on at least one of skills, customer location and historical performance patterns, configured to store a hierarchy of individuals in a database based on performance, and configured to select an individual from said plurality of individuals for an appointment based on at least one of skills, customer location, and historical performance patterns of the plurality of individuals,
   wherein the microprocessor is configured to schedule said service appointment based on at least one of said estimated time of arrival or performance, a communication from a customer, business rules of a service provider and the statistical determination of performance of the service provider,
   wherein said microprocessor is configured to determine the estimated time of arrival or performance of a service appointment based on an individual's learned historical performance patterns, and
   wherein the microprocessor is configured to determine the estimated time of arrival or performance of the service appointment further based on real time service delivery data.

2. The apparatus of claim 1, further comprising a notification engine configured to provide a predetermined notification to the customer related to an appointment.

3. The apparatus of claim 2, wherein the predetermined notification includes a reminder to the customer of an appointment.

4. The apparatus of claim 2, wherein the predetermined notification includes a notification of a change in an appointment schedule.

5. The apparatus of claim 1, wherein the statistical determination is based on at least one of duration of appointment, start of appointment, or end of appointment.

6. The apparatus of claim 1, wherein the microprocessor is configured to select a service provider from a plurality of service providers for an appointment based on the historical performance patterns of the plurality of service providers.

7. A method of dynamically managing appointments between a customer and a service provider, said service provider including a plurality of individuals, said method comprising the steps of:
   receiving requests for a service appointment from a customer;
   monitoring performance of each of said plurality of individuals so as to provide a continuously updated statistical evaluation for each of said plurality of individuals;
   determining, using a microprocessor, the estimated time of arrival or performance of the service appointment based on an individual's learned historical performance patterns;
   determining, using a statistics engine, statistical characteristics of a performance of the service provider based on at least one of: historical performance patterns, a type of service requested during a requested appointment, geographic location of the customer or the service provider, time of day, time of year, weather, skills of the service provider, or automobile traffic conditions:
   determining, using a microprocessor, if a delay occurs in a schedule of appointments and determining if the delay will propagate to affect other appointments,
   wherein the determination if a delay will propagate is based on at least one of a type of appointment of the requested appointment, a type of delay of the delay, and a statistical determination of delay propagation based on historical information related to the requested appointment;
   maintaining a self-calibrating repository of personal performance patterns for each individual based on at least one of skills, customer location and historical performance patterns, storing a hierarchy of individuals in a database based on performance, and selecting an individual from said plurality of individuals for an appointment based on at least one of skills, customer location, and historical performance patterns of the plurality of individuals; and
   scheduling the service appointment of a customer with a service provider based on at least one of said estimated time of arrival or performance, a communication from a customer, business rules of a service provider and the statistical characteristics of the performance of the service provider,
   wherein the determining the estimated time of arrival or performance of the service appointment step is further based on real time service delivery data.

8. The method of claim 7, further comprising the step of modifying the appointment schedule if the delay is determined to propagate, and notifying customers of a change in appointment schedule.

9. The method of claim 8, wherein the step of determining if the delay will propagate includes determining one of: whether the service is repetitive, whether the delay was caused by a global problem, or whether the delay is likely to propagate based on historical information indicative of characteristics of the appointment.

10. The method of claim 7, further comprising selecting a service provider from a plurality of service providers for an appointment based on the historical performance patterns of the plurality of service providers.

11. The method of claim 7, further comprising the steps of prompting customers to respond to automated messages confirming an appointment and applying a response of the customer to an existing appointment schedule.

12. The method of claim 7, further comprising the steps of periodically collecting statistical data indicative of the statistical determination of performance of at least one individual of the service provider, evaluating business rules of the service provider using the statistical data, and providing optimization recommendations.

13. A non-transitory computer readable storage medium with an executable program stored thereon, wherein the program instructs a microprocessor to perform the following steps for dynamically managing appointments between a customer and a service provider including a plurality of individuals, said method comprising the steps of:

receiving requests for a service appointment from a customer;

monitoring performance of each of said plurality of individuals so as to provide a continuously updated statistical evaluation for each of said plurality of individuals;

determining, using a microprocessor, the estimated time of arrival or performance of the service appointment based on an individual's learned historical performance patterns;

determining, using a statistics engine, statistical characteristics of a performance of the service provider based on at least one of: historical performance patterns, a type of service requested during a requested appointment, geographic location of the customer or the service provider, time of day, time of year, weather, skills of the service provider, or automobile traffic conditions:

determining, using a microprocessor, if a delay occurs in a schedule of appointments and determining if the delay will propagate to affect other appointments, wherein the determination if a delay will propagate is based on at least one of a type of appointment of the requested appointment, a type of delay of the delay, and a statistical determination of delay propagation based on historical information related to the requested appointment;

maintaining a self-calibrating repository of personal performance patterns for each individual based on at least one of skills, customer location and historical performance patterns, storing a hierarchy of individuals in a database based on performance, and selecting an individual from said plurality of individuals for an appointment based on at least one of skills, customer location, and historical performance patterns of the plurality of individuals; and scheduling the service appointment of a customer with a service provider based on at least one of said estimated time of arrival or performance, a communication from a customer, business rules of a service provider and the statistical characteristics of the performance of the service provider, wherein the determining the estimated time of arrival or performance of the service appointment step is further based on real time service delivery data.

14. The non-transitory computer readable storage medium of claim 13 further comprising instructions to perform the steps of modifying the appointment schedule if the delay is determined to propagate, and notifying customers of a change in appointment schedule.

15. The non-transitory computer readable storage medium of claim 13, wherein the step of determining if the delay will propagate includes determining one of: whether the service is repetitive, whether the delay was caused by a global problem, or whether the delay is likely to propagate based on historical information indicative of characteristics of the appointment.

16. The non-transitory computer readable storage medium of claim 13, further comprising instructions to perform the step of selecting a service provider from a plurality of service providers for an appointment based on the historical performance patterns of the plurality of service providers.

17. The non-transitory computer readable storage medium of claim 13, further comprising instructions to perform the steps of prompting customers to respond to automated messages confirming an appointment and applying a response of the customer to an existing appointment schedule.

18. The non-transitory computer readable storage medium of claim 13, further comprising instructions to perform the steps of periodically scanning system logs to collect statistical data indicative of the statistical determination of performance of at least one individual of the service provider, evaluating business rules of the service provider using the statistical data, and providing optimization recommendations.

* * * * *